(12) United States Patent
Heatherington et al.

(10) Patent No.: US 6,971,691 B1
(45) Date of Patent: Dec. 6, 2005

(54) VEHICLE BUMPER BEAM

(75) Inventors: David W. Heatherington, Spring Lake, MI (US); Scott C. Glasgow, Spring Lake, MI (US); Bruce W. Lyons, Grand Haven, MI (US)

(73) Assignee: Shape Corporation, Grand Haven, MI (US)

(*) Notice: Subject to any disclaimer, the term of this patent is extended or adjusted under 35 U.S.C. 154(b) by 0 days.

(21) Appl. No.: 10/955,384

(22) Filed: Sep. 30, 2004

Related U.S. Application Data (63) Continuation-in-part of application No. 10/877,326, filed on Jun. 25, 2004.

(51) Int. Cl.[7] .................... B60R 19/02; B60R 19/04
(52) U.S. Cl. .................... 293/102; 293/132; 293/154
(58) Field of Search .................. 293/102, 117, 120, 293/121, 132, 133, 154, 155; 296/146.6, 296/187.01, 187.03, 187.09, 187.1; 188/377

(56) References Cited

U.S. PATENT DOCUMENTS

| | | | |
|---|---|---|---|
| 4,018,466 A | | 4/1977 | Norlin |
| 4,072,334 A | | 2/1978 | Seegmiller et al. |
| 4,088,357 A | * | 5/1978 | Klie et al. .................. 293/122 |
| 4,391,464 A | | 7/1983 | Masotti et al. |
| 4,397,490 A | | 8/1983 | Evans et al. |
| 4,422,680 A | | 12/1983 | Goupy |
| 4,474,395 A | * | 10/1984 | Harloff et al. ............. 293/120 |
| 4,533,166 A | | 8/1985 | Stokes |
| 4,652,032 A | * | 3/1987 | Smith ......................... 293/120 |
| 4,762,352 A | | 8/1988 | Enomoto |
| 4,830,416 A | | 5/1989 | Matsuoka |
| 5,577,796 A | | 11/1996 | Clausen |
| 5,722,708 A | | 3/1998 | Jonsson |
| 5,997,058 A | | 12/1999 | Pedersen |
| 6,179,355 B1 | | 1/2001 | Chou et al. |
| 6,343,820 B1 | | 2/2002 | Pedersen |
| 6,349,521 B1 | | 2/2002 | McKeon et al. |
| 6,352,297 B1 | | 3/2002 | Sundgren et al. |
| 6,360,441 B1 | | 3/2002 | Himsl et al. |
| 6,398,275 B1 | | 6/2002 | Hartel et al. |
| 6,406,078 B1 | * | 6/2002 | Wycech ....................... 293/120 |
| 6,435,579 B1 | * | 8/2002 | Glance ......................... 293/155 |
| 6,467,831 B1 | * | 10/2002 | Mori et al. ................... 296/102 |
| 6,485,072 B1 | | 11/2002 | Werner et al. |

(Continued)

FOREIGN PATENT DOCUMENTS

WO    WO 03/037688 A1    5/2002

*Primary Examiner*—H. Gutman
(74) *Attorney, Agent, or Firm*—Price Heneveld Cooper DeWitt & Litton LLP (57) ABSTRACT

A bumper beam includes an open front section made from a high-strength material such as ultra-high-strength steel (UHSS) material, and further includes a mating back section made of lower-strength material attached to a rear side of the front section along abutting flanges. The front and back sections combine to define different tubular cross sections. The front section can be roll-formed, and the back section can be stamped, thus taking advantage of roll-forming processes' ability to form high-strength materials, while allowing the back section to have a more complicated shape and be stamped. The abutting flanges telescopingly overlap in a fore-aft direction of the vehicle and are welded together at locations that potentially experience shear upon impact, but the flanges of the front section are captured within the flanges of the backs section, thus providing impact strength even if the attachment locations shear off.

14 Claims, 7 Drawing Sheets

U.S. PATENT DOCUMENTS

| | | |
|---|---|---|
| 6,540,276 B2 | 4/2003 | Azuchi et al. |
| 6,592,158 B2 | 7/2003 | Kettler et al. |
| 6,669,252 B2 | 12/2003 | Roussel et al. |
| 6,679,540 B1 * | 1/2004 | Graber et al. ............ 296/146.6 |
| 6,684,505 B2 | 2/2004 | Sundgren et al. |
| 6,726,259 B2 | 4/2004 | Kettler et al. |
| 6,726,261 B2 | 4/2004 | Goto et al. |
| 6,726,262 B2 | 4/2004 | Marijnissen et al. |
| 6,764,119 B2 * | 7/2004 | Bladow et al. ............ 293/155 |
| 2001/0017473 A1 | 8/2001 | Yamamoto |
| 2001/0054827 A1 | 12/2001 | Sundgren et al. |
| 2002/0005644 A1 * | 1/2002 | Tamada et al. ............ 293/120 |
| 2002/0033610 A1 * | 3/2002 | Mori et al. ................. 293/102 |
| 2002/0047281 A1 * | 4/2002 | Hartel et al. ................ 293/102 |
| 2002/0053805 A1 * | 5/2002 | Azuchi et al. ............. 293/102 |
| 2002/0069609 A1 * | 6/2002 | Nees et al. ................ 52/735.1 |
| 2002/0089196 A1 * | 7/2002 | Porter ....................... 293/120 |
| 2002/0180222 A1 | 12/2002 | Janssen |
| 2003/0034657 A1 | 2/2003 | Garcia et al. |
| 2003/0218341 A1 | 11/2003 | Jonsson et al. |
| 2004/0007886 A1 | 1/2004 | Hallergren |
| 2004/0066048 A1 | 4/2004 | Mooijman et al. |
| 2004/0174041 A1 * | 9/2004 | Graber et al. ............ 296/146.6 |

* cited by examiner

VEHICLE BUMPER BEAM

This is a continuation-in-part of co-assigned application Ser. No. 10/877,326, filed Jun. 25, 2004, entitled VEHICLE BUMPER BEAM, the entire contents of which are incorporated herein in their entirety.

BACKGROUND

The present invention relates to vehicle bumper beams, and more particularly relates to a bumper beam having a front section of continuous shape and a back section attached to the front section to make a tubular beam of changing cross-sectional size.

Two basic types of bumper beams often used on modern vehicles are tubular sections (also called closed sections, such as "B" or "D" shapes) and open sections (such as "C" sections or "hat" sections). The tubular sections and also the open sections each have their own advantages and disadvantages. For example, from an engineering standpoint, bumper beams made from tubular sections are inherently more rigid and capable of absorbing and/or transmitting more energy (especially based on a strength-to-weight ratio) on impact due to the way that impact stresses are distributed around and along the tubular shapes. In contrast, open sections tend to prematurely buckle during impact since the "legs" of the open sections will spread apart, kink, and quickly lose shape upon impact. However, open sections tend to allow more styling and product variation. There is a concurrent strong desire to use high-strength materials for bumpers because it reduces weight while providing higher impact strengths (as compared to lower strength materials). However as higher and higher-strength materials are used, it becomes more and more difficult to form raw sheet stock into the desired beam shape, because the higher-strength materials are harder and harder on tooling and the presses that run them. This is especially true for stamping presses and stamping dies, where the dies move perpendicularly against a sheet to form the sheet. Roll-forming processes have the ability to form higher-strength materials than stamping processes, however roll-forming processes are limited to producing a constant cross-sectional shape along a length of the roll-formed parts.

Roll-forming is a particularly attractive manufacturing method because dimensionally-accurate bumper beams can be mass-produced at good production speeds, with minimal manual labor, and using high-strength materials, yet the tooling can be made more durable and long-lasting than stamping dies when used to shape ultra-high-strength steels and high-strength low-alloy steels. For example, Sturrus U.S. Pat. No. 5,092,512 and Sturrus U.S. Pat. No. 5,454,504 disclose roll-forming apparatus of interest. However, as noted above, a drawback to roll-forming is that the roll-forming process can only produce a constant cross section over the entire length of the part. Further, the material thickness and material strength of the raw coil stock cannot change around a given cross section, since the material begins as a unitary coil of material. Regarding the constant cross section produced by roll-forming, this often does not satisfy current styling trends which require variations in cross-sectional size along a length of the beam due to packaging space over the vehicle frame rails (versus the packaging space available at a centerline of the vehicle), or which require a longitudinal sweep with an increased curvature at corners of the vehicle (e.g. at the fenders). These styling conditions require roll-formed tubular parts to be end-formed or taper cut at their ends by secondary processes. But these secondary processes are expensive because end-forming and/or taper cutting the parts is not easy (particularly when they are made of high-strength materials). Also, the process of end-forming and/or taper cutting require more than one secondary process. For example, taper cutting requires some sort of cap to cover the sharp edges that result from the cutting process, which must be accurately fixtured and then welded in place. Alternatively, the ends of tubular sections may be reformed to better fit functional and aesthetic styling concerns (see Sturrus U.S. Pat. No. 5,306,058), but it is difficult to accurately and consistently deform the ends, thus potentially leading to unacceptable dimensional variations and high tooling wearout.

Figure 1:
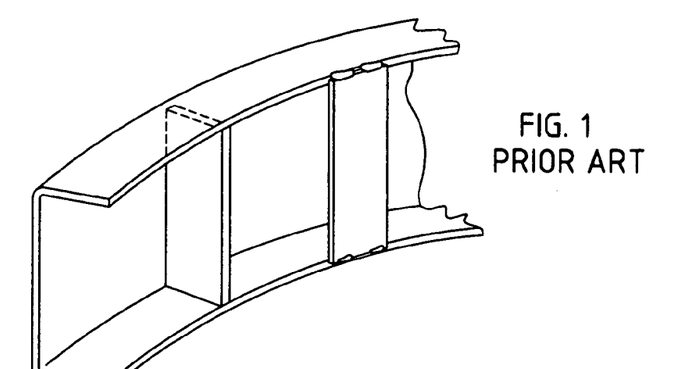
FIG. 1 is a schematic view illustrating prior art beam constructions.

Beams made from C-shaped open sections can be formed to a desired three-dimensional shape, including non-uniform cross sections along their length, but their open section is inherently not as strong as a tubular shape during an impact. Specifically, the open sections include rearwardly-extending legs that tend to prematurely spread apart or otherwise collapse upon impact. This greatly reduces the beam's overall sectional impact strength and reduces its ability to consistently and predictably absorb energy. By stabilizing the legs of the front section, the front sections can be made much stronger and more energy-absorbing. This is sometimes done in prior art by adding reinforcements such as bulk heads, flat plating, and/or bridging between the legs to prevent the legs from prematurely spreading during an impact. (See FIG. 1 in the present drawings.) By stabilizing the legs of an open section, it can be made to come closer to matching the performance of the tubular sections. However, these additional reinforcements require expensive secondary operations since they utilize considerable fixturing and welding machinery, and they often require several additional parts and considerable assembly time and in-process inventory. Also, the process of welding multiple reinforcements to an open beam can be difficult to control, since multiple parts must be carefully separately fixtured and each and every one of the parts welded very consistently in place. Also, the location of each stabilizing strap can greatly affect impact strengths along the beam.

To summarize, packaging and performance requirements of bumper beams on vehicles and related vehicle front end (or rear end) components often increase the complexity of a bumper design since they result in the addition of other structural components, which might include bridges, bulkheads, radiator supports, fascia supports, fascia, and the like. Or they may require end treatment of the bumper beam to include end-forming or taper cutting, so as to form an increased angle at an end of the bumper in front of the fenders. This increase in complexity results in an increase in cost due to substantial secondary processing. It also results in difficult tradeoffs between function and styling criteria. It is desirable to provide a design and process that overcomes the drawbacks of constant cross section roll-formed sections, yet that takes advantage of roll-forming processes as a way of forming ultra-high-strength materials for use in bumper beams, as discussed below. Also, it is desirable to provide design flexibility that allows tuning of the bumper beam in the bumper development program, which can be very important for timing and investment reasons. At the same time, it is desirable that the ultra-high-strength steels be an option for components so that the bumper beam can be designed for optimally high strength-to-weight ratios. Still further, even though ultra-high-strength steels are used, it is desired that the arrangement allow for some use of less expensive materials and of materials that allow the use of relatively simple forming and bending tooling to minimize investment while still being able to form the ultra-high-strength materials without expensive tooling and without having tooling quickly wear out. In other words, it is desirable to utilize stamped or molded reinforcing components where possible and in combination with high-strength materials where it makes practical sense to do so.

An additional problem is that ultra-high-strength materials are difficult to form in stamping presses, or at least it is preferable not to do so. Specifically, those skilled in the art prefer not to stamp materials such as ultra-high-strength steels (UHSS) because the UHSS material is so strong that it is hard to form without cracking and that it damages or quickly wears out the stamping dies and the stamping press.

Thus, a bumper beam having the aforementioned advantages and solving the aforementioned problems is desired.

SUMMARY OF THE PRESENT INVENTION

In one aspect of the present invention, a bumper beam for a vehicle includes a metal front section of higher material strength, the front section including a front wall and upper and lower walls defining a rearwardly-facing C-shaped cross section and a rearwardly open cavity. The beam further includes a metal back section of lesser material strength, the back section including a rear wall and top and bottom walls defining a forwardly-facing C-shaped cross section and a forwardly open cavity. The upper and lower walls of the front section are positioned within the forwardly open cavity of the back section and telescopingly engaging the top and bottom walls, respectively, of the back section and are secured thereto at top and bottom attachment locations that are subject to shearing forces upon impact. The front section and rear section combine to form a tubular section of changing cross-sectional size that, when impacted, provides significant impact strength, even if one or more of the attachment locations shearingly break loose.

In another aspect of the present invention, a bumper beam is provided that is adapted to withstand an impact force directed along a predetermined fore-aft direction of impact against a vehicle. The bumper beam includes a front section including a front wall and top and bottom walls defining a constant U-shaped cross section having a rearwardly open cavity, the front section being elongated in a direction perpendicular to the predetermined fore-aft direction of impact, the front section being made from a material selected from a group consisting of high-strength low-alloy (HSLA) steel and ultra-high-strength steel (UHSS) material. The bumper beam further includes a back section fit against and attached to a rear side of the front section, the back section having a length close to a length of the front section and including a first longitudinal portion that extends between the top and bottom walls to define a first shape having a first depth dimension, and including second longitudinal portions on opposing sides of the first portions that extend between the top and bottom walls to define a second shape having a second depth dimension, at least one of the first and second shapes being tubular, the back section being made from a material selected from a group consisting of ultra-high-strength steel (UHSS) material, high-strength low-alloy (HSLA) steel, aluminum, and polymeric material. The front and back sections have attachment flanges that telescopingly overlap in a direction parallel to the predetermined fore-aft direction of impact. The attachment flanges are secured together at attachment locations that undergo shear stress upon the beam receiving the impact force along the fore-aft direction, but the attachment flanges of the front section are located inside the attachment flanges of the back section so that, even if the attachment locations shear off, the attachment flanges of the front section remain captured within the attachment flanges of the back section.

In another aspect of the present invention, a method comprises steps of roll-forming a front section including a front wall and top and bottom walls defining a constant cross section and a rearwardly open cavity, and stamping an elongated back section from a sheet of material, the back section having a length approximating the front section. The method further includes fitting the back section against a rear side of the front section, the back section including a first longitudinal portion that defines with the front section a first cross-sectional shape having a first depth dimension, and including second longitudinal portions on opposing sides of the first portions that fit against the front section to define a second cross-sectional shape having a second depth dimension; the front and back sections having attachment flanges that telescopingly overlappingly engage in a direction generally perpendicular to the front wall. The method still further includes attaching the attachment flanges together to secure the back section to the front section together to form a reinforced beam section, the attachment flanges of the front section being positioned inside of and captured by the attachment flanges of the back section even if some of the attachment locations shear off and come loose.

An object of the present invention is to provide a design that accommodates complexity without a concurrent increase in cost due to the need for substantial secondary processing.

Another object of the present invention is to provide a design and process that overcomes the drawbacks of roll-formed sections having a constant cross section, yet that allows their use to make beam sections with ultra-high-strength materials.

Another object of the present invention is to provide design flexibility that allows tuning of the bumper beam (early or late) in the bumper development program, which can be very important for timing and investment reasons.

Another object of the present invention is to provide a design that allows use of materials such as ultra high-strength steels for components so that the bumper beam can be designed for optimally high strength-to-weight ratios, while yet keeping the ability to provide optimal beam strengths in particular regions of the beam.

Another object of the present invention is to provide an arrangement allowing for relatively simple forming and bending tooling to minimize investment while still being able to form the ultra-high-strength materials without prohibitively expensive tooling and without having tooling and/or stamping presses quickly wear out.

Another object of the present invention is to provide a bumper beam design where a size of the beam's tubular cross section can easily and substantially be varied across an entire length of the bumper beam, even where very high-strength materials are used. Yet this can be accomplished without substantial secondary processing and/or heat treating and/or annealing.

Another object is to provide a bumper beam that optimally utilizes roll-forming processes and stamping processes to make component sections of the beam.

The present invention overcomes the drawbacks of roll-formed sections having a constant cross section, by providing for an optimized utilization of geometry and material to produce a bumper beam that possesses the strength and rigidity characteristics of a tubular bumper section. The present invention combines manufacturing processes and material to produce a tubular section that has varying cross-sectional geometries along a length of the part and different material properties around the cross section of the part. The present invention differs from prior art that includes the addition of material to specific areas to provide localized stiffening.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 2:
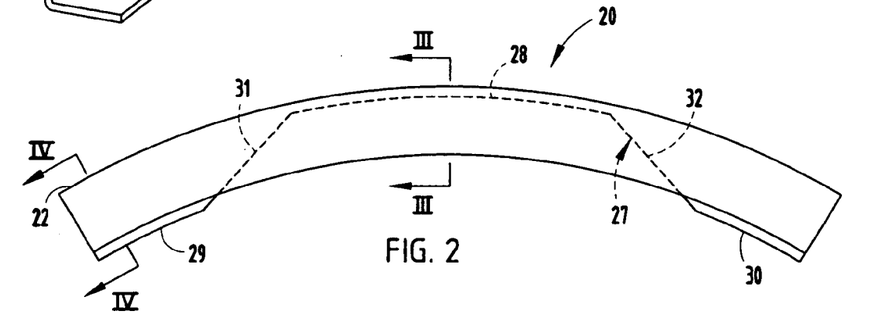
FIG. 2 is a top view of a bumper beam embodying the present invention, including an open front section (also called a "hat section") and a back section attached to its rear face.
Figure 3:
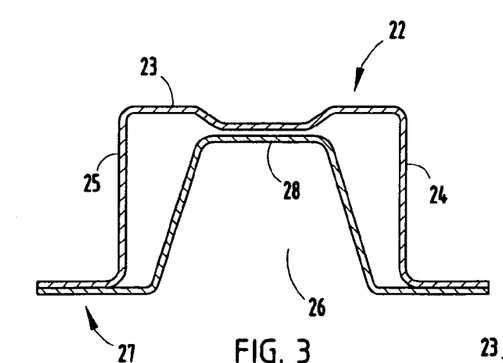
FIGS. 3–4 are cross sections along lines III—III and IV—IV in FIG. 2.
Figure 4:
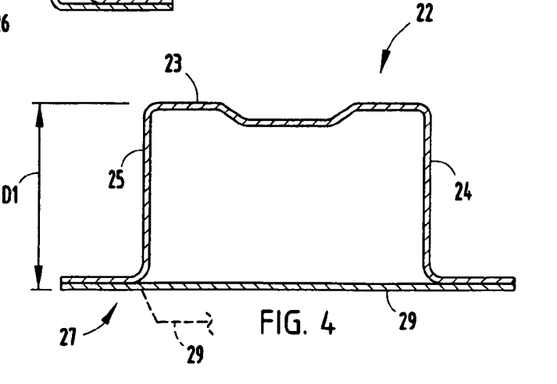
Figure 4A:
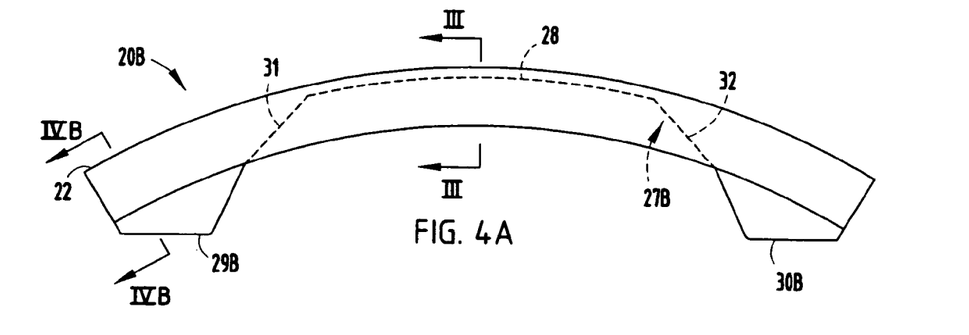
FIG. 4A is a modified version of FIG. 1.
Figure 4B:
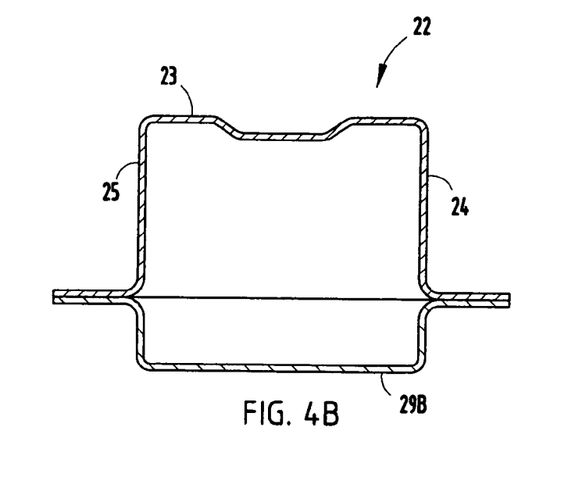
FIG. 4B is a cross section along line IVB—IVB.
Figure 5:
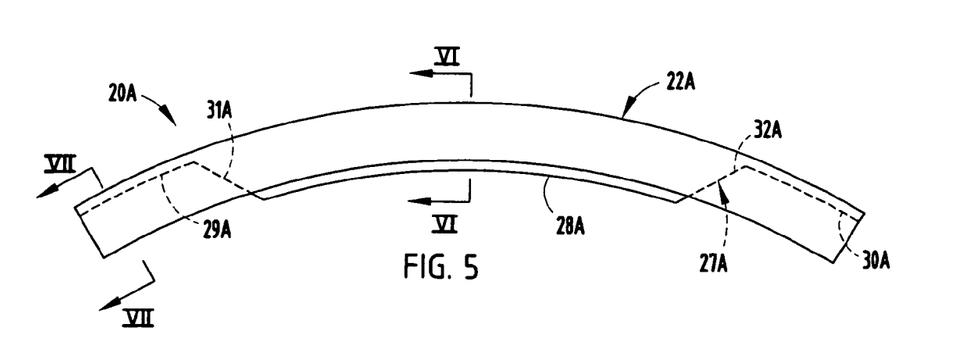
FIG. 5 is a top view of a bumper beam embodying the present invention, including an open front section and a back section attached to its rear face.
Figure 6:
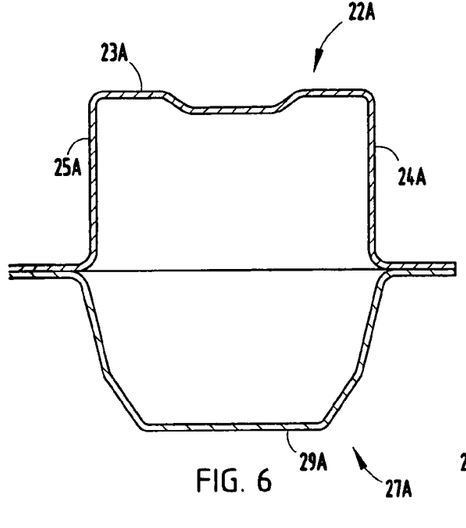
FIGS. 6–7 are cross sections along lines VI—VI and VII—VII in FIG. 5.
Figure 7:
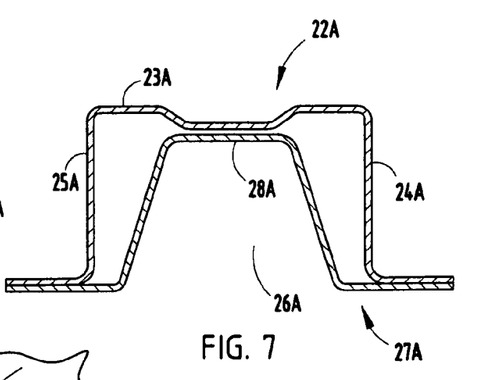

The present invention focuses on a bumper beam 20 (FIG. 2) (and beam 20A, FIG. 5; and beam 20B, FIG. 4A) utilizing a roll-formed front section (22, 22A) (also called a "front channel" or "rolled section") and a stamped or molded back section (27, 27A, 27B) (also called a rear channel" or "reinforcement section") mated together to form a beam of varied tubular cross-sectional shape. More specifically, the present invention represents a two-piece solution that when combined produces a tubular bumper beam with varying cross section across the length of the bumper and material properties that change around the cross section. The ability to change cross section across bumper length allows for optimization of impact beam performance, weight, and cost along any selected region of the beam. For example, the use of ultra-high-strength steels (UHSS steels) provides desirable characteristics for impact beam construction. The high mechanical properties inherent to UHSS steels support impact beam designs with high levels of energy absorption for structural components that deform with impact loading. The UHSS material also provides desirable spring back characteristics that help in returning beam sweep and cross-sectional geometry after impact loading is relieved, and also provides for excellent strength-to-weight ratios in each region. The present invention takes advantage of the material properties of UHSS material, even though the UHSS material presents difficult manufacturing issues when considered for stamping. For example, UHSS material, since they are ultra-strong, are difficult to form. They also tend to rapidly wear out tooling. In fact, the mechanical properties inherent to UHSS materials make them a poor choice for stampings. The roll-forming process is capable of forming complicated parts from UHSS due to the more stepped approach associated with forming a simple uncomplicated geometry. The limitations associated with forming UHSS materials are not as restrictive when roll-forming as compared to stamping. The present invention takes advantage of the ability to roll form the UHSS material and uses the high mechanical properties associated with the UHSS material to produce impact systems that are conscious of performance, weight, and cost.

Figure 9:
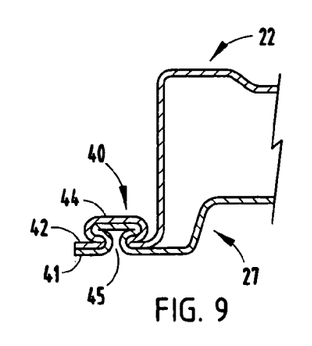
Figure 10:
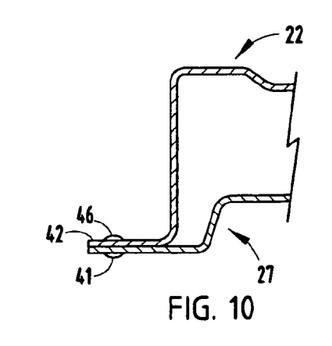
Figure 11:
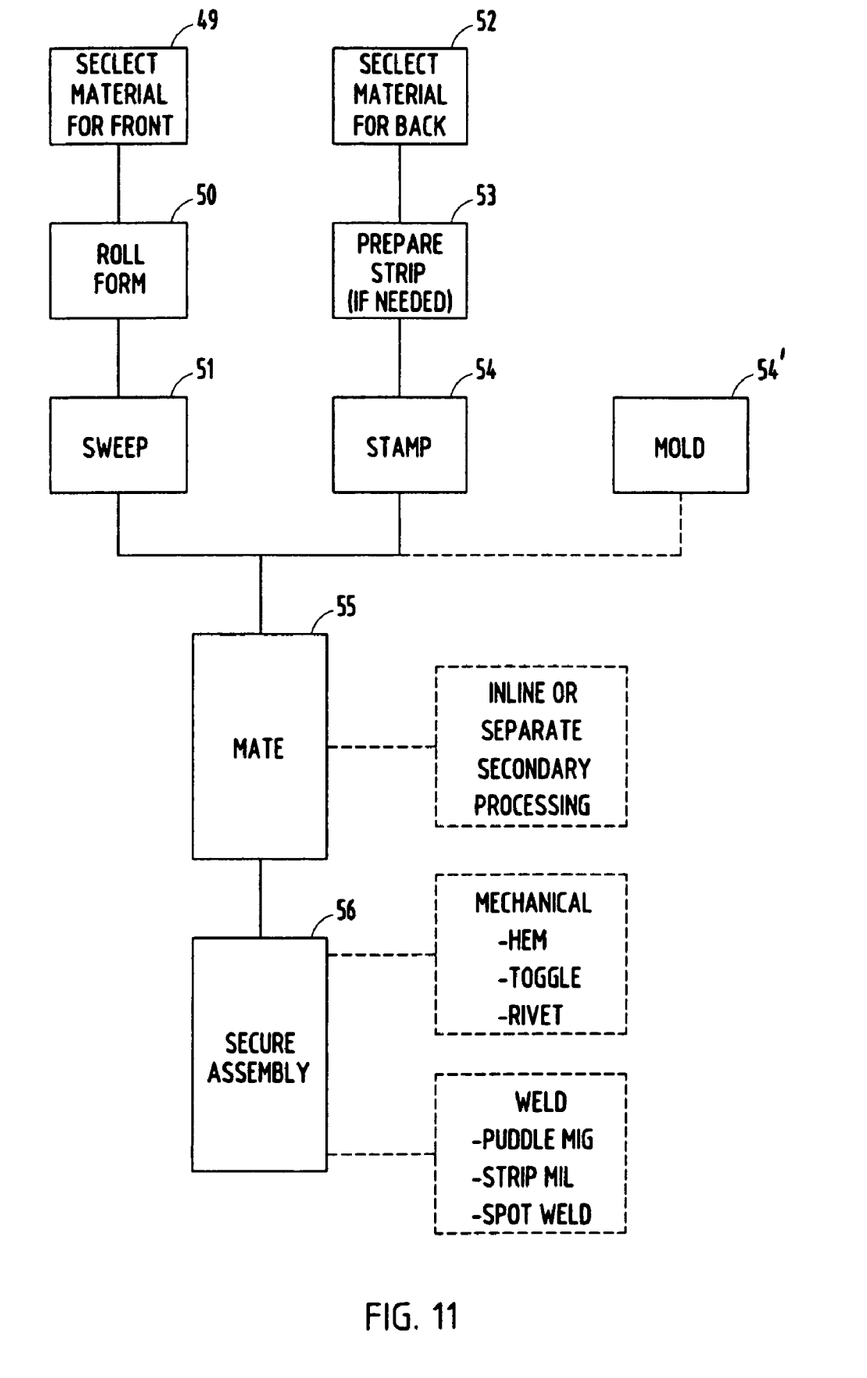
FIG. 11 is a flow chart showing a method of manufacture for beams in FIGS. 2 and 5.

In beam 20 (FIG. 2), the impact face (herein called the "front section 22") of the bumper beam is a roll-formed section made from an UHSS material. The rear face (herein called the "rear section 27") of the impact beam is a stamped part with relatively flat sections and is made from a high-strength low-alloy (HSLA) steel. The two halves of the impact beam are joined together at the flanges, such as by welding (FIGS. 2 and 11), crimping (FIGS. 9 and 11), or mechanical fastening (FIGS. 10 and 11). The combination of the two manufacturing processes and different materials produces an impact beam that can have an infinite number of carefully designed geometries along a length of the impact beam, such as differently-sized tubular sections, and different materials from front to back of the impact beam. This flexibility allows for the design of an impact beam that can be optimized for performance, weight, and cost.

It is clear from beam 20 (FIG. 2) that beam strength can be greatly varied along different portions of a length of the part. However, this advantage is even more dramatically shown by studying the beam 20A (FIG. 5), where a "deep" tubular cross section is formed at the center of the beam 20A and a "shallow" tubular (or laminar) dimension is formed at the ends of the beam 20A. For example, the design in FIG. 5 will allow for more centerline deformation while providing considerable section stiffness and reduced section deformation over the frame rails at ends of the beam 20A.

Persons skilled in the art of vehicle bumper beams will recognize that an increase in impact beam depth will increase stiffness of the section and make it more stable during impact, and further will realize the tremendous advantages of doing this at strategic locations along the beam. The beam 20A (FIG. 5) uses the stamped section to increase section depth at a vehicle's center region while providing a shallower section over the frame rails at ends of the beam. The shallow depth over the frame rails reduces the packaging space required to package the design at the rails, and will allow for more curved styling at the ends of the impact beam. The ability to easily deform the shallower depth over the vehicle frame rails is overcome by having the stamped section increase stiffness over the frame rails via geometry (i.e. the laminated "zero depth" section double-wall sections 29A and 30A at the rails) and not section depth.

The roll-formed front impact face (front section 22 or 22A) of the impact beam is a constant cross section across its center region and can either be swept at a constant sweep radius or could potentially be swept at a compound sweep radius by tooling in-line with the roll-forming process. The constrained sweep radius will cause more localized loading and potentially more system stroke (intrusion into the vehicle) as measured from the front face inward to the vehicle. Typical compound swept beams would provide for a flatter surface across the center of the impact beam and greater curvature on the ends of the impact beam. The compound sweep may be more accommodating for current styling trends in vehicles. A compound swept beam would allow for distributed loading across the front face of the impact and in turn less system stroke of the impact beam. The ability of a compound swept beam to distribute load across a greater surface area can also be replicated with a constant swept beam and an engineered energy absorber. The energy absorber would be engineered to easily crush across a greater length from impact beam center and in turn load the impact beam over a greater distance extending from impact beam center.

Figure 8:
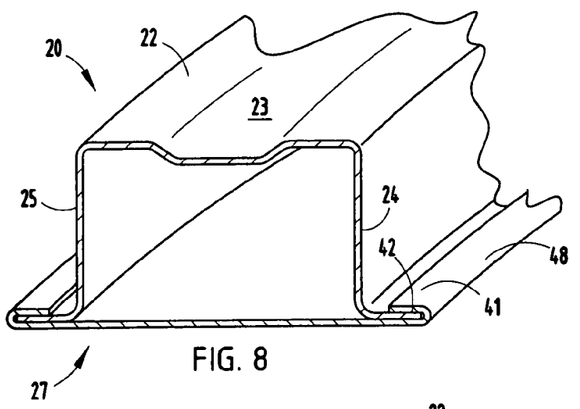
FIGS. 8–10 are alternative attachment structures for securing the front section and the back section together.

The front and rear sections of the impact beams can be attached using different attachment methods. These methods would include crimping or hemming (FIG. 8), welding (FIGS. 2–4, 4A–4B and 5–7), mechanical fastening processes (FIGS. 9–10), or other attachment means known in the art for securing two structural components together. Each of the illustrated methods are potentially suitable for joining and each method would potentially produce an impact beam suitable for crashworthiness. The attachment method of choice for each system constructed according to the present invention would be identified and supported with a cost analysis of each of the methods.

The present invention illustrated in the beams 20 and 20A (FIGS. 2 and 5) is an impact beam system constructed from a roll-formed UHSS front section and a stamped HSLA rear section. It is to be understood by those skilled in the art that various other materials can be used to design a system that may or may not trade off on the design criteria of performance, weight, and/or cost. For example, the front section (22 or 22A or 22B) can be made from UHSS material, HSLA material, drawable-grade steel, boron steel which is heated and quenched after forming, high-strength aluminum, extruded aluminum, polymeric material, or other engineering structural materials. The rear section (27 or 27A or 27B) can also be made from HSLA material, drawable-grade steel, boron steel which is heated and quenched after forming, high-strength aluminum, extruded aluminum, polymeric material, and other engineering structural materials. In each of these materials, their thickness and hardness can be varied within parameters of commercially available raw material. It is contemplated that the back section could be made from UHSS material, but that a shape of the back section would need to be potentially modified or simplified (such as by modifying back section 27 to include a shallower draw at center section 28, or to eliminate the flanges and side walls at sections 28, 31–32) if one desires to produce a significant number of bumpers, since the UHSS material is very tough on tooling and hard to form due to low elongation. One alternative contemplated by the present inventors is to provide a sheet of material for producing the back section (27 or 27A or 27B) from a plurality of strips welded together. For example, for beam 20 (FIG. 2), strips of UHSS material would be welded to opposite edges of a center strip of drawable grade steel. The strips of UHSS material would each have a width sufficient to form the sections 29 and 30, while the center strip of drawable grade steel would have a width sufficient to form sections 28, 31, and 32.

The ultra-high-strength steel (UHSS) material is a well known and well defined category of material in the art. UHSS material commonly has a tensile strength of about 120 to 200 KSI (or higher). The high-strength low-alloy (HSLA) steel material is also a well known and well defined category of material in the art. There are HSLA steel materials that are 120 KSI, but the higher grade HSLA materials are not usually considered stampable. Nonetheless, it should be understood that the ability to stamp is also related to material thickness, size and shape of the part being stamped, and the degree of material flow and "draw" required. HSLA steel material that can be stamped has a tensile strength commonly around 80 KSI. Boron steels and heat-treatable hardenable steels can also be used. For example, boron steels can be formed while at lower KSI strengths, and then hardened either during a stage of the forming process or in secondary processing. Higher-strength aluminum materials are also well known in the art. For example, it is contemplated that aluminum series 6000 materials will work in the present invention. The aluminum series 6000 material commonly has a tensile strength of up to about 40 KSI. Some extrudable grades of aluminum may also work in forming front section 22, such as extrudable aluminum series 6000 or 7000 materials. Back sections 22 may also be made from glass-reinforced nylon, glass-reinforced polyester, or other (reinforced or unreinforced) structural polymers.

As noted above, the illustrated bumper beam 20 (FIG. 2) includes a front section 22 and a rear section 27. The front section 22 include a front wall 23 and top and bottom walls 24 and 25 defining a constant open cross section (also often called a hat-shaped section) that defines a rearwardly open cavity 26. The illustrated front section 22 is longitudinally swept (i.e. curved), such as by a process disclosed in Sturrus U.S. Pat. Nos. 5,306,058 and 5,395,036, the entire contents of which are incorporated herein by reference for the purpose of teaching formation of the front section 22. The bumper beam 20 further includes an elongated back section 27 fit against and attached to a rear side of the front section 22. The back section 27 includes a longitudinal center portion 28 that is curved longitudinally to match the associated center region of the beam 22, and that is deep-drawn to generally match a cross-sectional shape of the front section 22. The back section 27 further includes end portions 29 and 30 that are also curved longitudinally to match the associated end regions of the beam 22, and still further includes angled intermediate portions 31 and 32 that interconnect the end portions 29 and 30 to the center portion 28. The center portion 28 is hat-shaped and includes a middle portion that lies relatively close or in contact with the front wall 23 in the center region in a laminar arrangement, thus minimizing a total depth and strength of the "tubular part" of the cross section in the center area. At the same time, the top and bottom portions of the hat section stiffen and help stabilize the corresponding walls in the center of the front section 22. It is noted that the center region of the bumper beam 20 must be strong enough to pass impact testing against a center of the bumper beam 20 without unacceptable damage, yet the center region must be flexible enough to absorb energy or transmit energy for functional impact testing so that the vehicle itself does not become prematurely damaged during a front impact.

In the illustrated center region, the center portion 28 lies relatively tight against or in contact with the front wall 23 of the front section 22, but it is contemplated that any desired spacing can be created, such that the illustrated arrangement is intended to illustrate both a "flat tube" in the center region as well as a "non-flat" or "thin" tube in the center region. In the end regions, the end portions 29 and 30 of the back section 27 are fit against the rear edges of the top and bottom walls 24 and 25 to form a tubular cross-sectional shape having a "deep" depth dimension D1. It is contemplated that the end portions 29 and 30 of the back section 27 can be relatively flat (as illustrated by the solid lines in FIG. 4), or that the end portions 29 and 30 can have a reverse hat shape that extends in a direction opposite the hat shape of the center portion 28 of the back section 27 (as illustrated by the dashed lines in FIG. 4).

The angled intermediate portions 31 and 32 provide a changing cross-sectional tubular shape that transitions between the center and end portions of the beam 20. It is contemplated that the intermediate portions 31 and 32 can be deep-drawn to form mounting surfaces adapted for attachment to vehicle frame rails, such as the illustrated beam 20B having a back section 27B with deep-drawn mounting surfaces 29B and 30B (FIG. 4A) which are coplanar and spaced apart as desired.

It is contemplated that the back section 27 will be made by an optimal process. The illustrated back section 27 can be stamped using stamping technology. The simplicity of the back section 27 (FIG. 2) potentially allows it to be made from high-strength low-alloy (HSLA) material since it incorporates relatively simple bends. However, it is contemplated that drawable grade steel will be used whenever the back section 27 has "deep" areas that require material flow. Alternatively, it is contemplated that the back section 27 could be molded of polymeric material.

It is contemplated that top and bottom edges of the back section 27 can be secured to the front section 22 by several different means. For example, where steels are used for the front section 22 and the back section 27, MIG puddle welding or "standard" MIG welding can be used. It is also contemplated that various welding such as spot-welding can be used to secure edge flanges of the back section 27 and front section 22 together. Also, rivets and other mechanical attachment means known in the art can be used. Again, the optimal process will depend upon the strength and properties of the back section 27 and the front section 22, and also will depend on the functional requirements of the beam 20. Where a formable material is used, such as drawable steel, it is conceived that alternative attachment methods can be used such as a hemmed flange 35 (FIG. 9) where the edges of the back section 27 near the ends are doubled back on themselves to capture the edges 36 of the front section 22. Where the materials of the front and back sections differ, mechanical attachment may be preferred, such as rivets, hemming, or toggle-lock methods.

It is also conceived that a combination of attachment methods can be used, such as by using welding at critical high-stress areas, and rivets or other means on less-stressed attachment areas. Drawable steel and aluminum, depending on their grade, can be toggle-locked together, which is a mechanical connection using the material of the sheets themselves to form the rivet-like connection. An exemplary toggle lock connection 40 is shown in FIG. 9. It is noted that toggle lock technology is commercially available. In the toggle lock connection 40, the edge flanges 41 and 42 abut along end regions of the back section 27 and the front section 22. A tooling pin (not shown) is forced through the edge flanges 41 and 42 to stretch the flange material to form a double-thickness protrusion. The tooling pin is removed (or temporarily left in place during the peening step), and then the section is peened or struck in a manner causing the head 44 to mushroom while the neck 45 remains relatively thin. As a result the material of the back section's flange 41 in the head 44 is trapped by the material of the front section's neck 45 after the step of peening. The effect is much like a rivet 46, as shown in a lower portion of the FIG. 10. It is of course contemplated that rivets 46 could also be used for securement. Where the material of the reinforcement and/or the front section 22 are substantially different materials (such as one is steel and the other is aluminum or plastic), mechanical attachment such as by the use of rivets 46 or a hemmed edge are potentially a realistic and desirable option. Hemming the flanges 41–42 (i.e. folding one flange 41 back on itself to capture the mating flange 42) is an attractive alternative attachment method since it uses the material of the sections 22 and 27 themselves without the need for additional parts or components. The illustrated flange 41 is continuous, though a slit 48 could be used.

One contemplated alternative is to weld multiple strips of material together to form a long roll, from which the back section 27 would be made. The multiple strips of material would be chosen to have optimal strengths and material properties in each of their ultimate positions in the back section 27. For example, end portions 29 and 30 could be made from one material (such as UHSS), while the intermediate portions 31 and 32 and the center portion 28 could be from a more ductile or lower strength material such as HSLA steel. Also, the portions 28–32 could each have different material thicknesses and properties. A variety of different options are possible, as will be quickly understood by a person skilled in the art of vehicle bumper manufacture and in the art of roll-forming and stamping.

A bumper beam 20A (FIGS. 5–7) is similar to bumper beam 20 in many aspects. To reduce redundant discussion, the same numbers are used to identify the same or similar parts, features and characteristics, but with the addition of the letter "A". This is done to reduce redundant discussion, and not for another purpose.

The bumper beam 20A (FIGS. 5–7) is similar to bumper beam 20 in that it includes a front section 22A and a back section 27A. But in a center region of the bumper beam 20A, the back section 27A forms a tubular section with the front section 22A. At the same time, the illustrated end portions 29A and 30A of the back section 27A lie relatively close to and flat against the ends of the front section 22A. Thus, the bumper beam 20A has a tubular section across its center region, while its ends are stiffer. Potentially, the ends of the back section 27A have a B-shaped cross section as opposed to a laminar double-thick arrangement. The front section 22A and back section 27A of bumper beam 20A could be secured together by any of the illustrated attachment means shown in FIGS. 8–10 and/or the other attachment methods discussed herein.

The method of the present invention is shown in FIG. 11. The method includes selecting a strip of material in a step 49 (such as UHSS material, or UHLA steel material), and then roll-forming the strip of material in a step 50 to form an open front section 22 (which can be C-shaped, W-shaped, or hat-shaped), including (optionally) sweeping the front section in a step 51 to form a longitudinally curved part. The material for the back section 27 is selected in a step 52, prepared as required in a step 53, and stamped in a step 54. The step 53 of preparing the strip may include welding multiple strips (tailor welded blanks) together and/or heat-treating (e.g. annealing) various sections of a single strip so that particular strength characteristics end up at predetermined locations on the finish back section 27. It is contemplated that where heat-treating is used, this preparation can be done before, during, or after the step of stamping. Alternatively, instead of steps 52–54, the back section 27 can be made by molding in step 54' (or alternatively can be made using other forming and bending techniques). The back section 27 is then mated together with the front section 22 in a step 55, and then attached in a step 56. As noted above, the step 55 of mating the back section 27 to the beam 22 can form a variety of different shapes, including different tubular cross-sectional sizes and depths along a length of the beam 20. It is contemplated that the mating step 55 can be done in-line with the roll-forming machine, or done off-line in a secondary operation at an end of the roll-forming process such that it forms part of a continuous manufacturing process, or done off-line in a separate operation. Another option is to take the roll-formed front section and feed it into a transfer press where it is fastened to the back section after the back section has been stamped. For example, the transfer press could include tooling for stamping the back section 27. In a last stage (or near-to-last stage) of the stamping operation, the roll-formed front section 22 would be fed into the transfer press, and attached to the front section 22 such as by a hemming operation, welding, riveting, or a toggle-lock process. Alternatively, one could use mechanical fasteners or spot-welding in the press. It is contemplated that the attachment step 56 can include a variety of different attachment means, including welding (MIG puddle welding, standard MIG welding, spot-welding, mechanical fastening such as hemming attachment, toggle lock attachment (see earlier discussion on toggle lock and UHSS materials), rivet attachment, and other attachment means).

MODIFICATION

A modified bumper beam 20C (FIGS. 12–15) includes components, features, and characteristics similar or identical to the beams 20–20B. In beam 20C, identical and similar features are identified using the same identification numbers to reduce redundant discussion. Nonetheless, it should be understood that the discussion of beams 20–20B also apply to beam 20C.

Beam 20C (FIG. 12) includes a front section 22C and a back section 27C mated together to form a tubular beam of varying cross-sectional size along its length. The front section 22C is made of relatively higher-strength material, preferably a material such as ultra-high-strength steel (UHSS) or an advanced ultra-high-strength steel such as a material having a tensile strength of 220 KSI. The front section 22C preferably has a more uniform cross-sectional shape permitting it to be roll-formed. The back section 27C is made of a material, permitting it to be formed by a stamping operation. The vertical cross sections defined by the beam 20C have depth dimensions that are different depending upon where the cross section is taken along the beam's length, with each cross section being optimally suited for the particular location on the beam 20C for optimal impact strength and energy absorbing capability. The illustrated front section 22C and back section 27C include top and bottom edge flanges 41C and 42C that telescopingly overlap when the sections 22C and 27C are brought together. The abutting surfaces on the edge flanges 41C of the front section 22C and the edge flanges 42C of the back section 27C define horizontal planes that extend in a fore-aft direction. The edge flanges 41C and 42C are secured together, such as by spot-welding, or by a stitch or continuous weld such as a MIG weld, or by any of the various welding and mechanical attachment techniques previously disclosed in this application. It is noted that the edge flanges of the front section 22C are positioned inside the edge flanges of the back section 27C. This is so that, if the beam 20C is impacted sufficiently to shear the attachment weld (i.e. shear the weld bead or other attachment means), the front section 22C will slide rearwardly within the top and bottom walls of the back section 27C until the flanges 41C of the front section 22C engage the rear wall of the back section 27C. By this mechanism, the front section 22C is contained within the back section 27C, and the beam 20C retains a majority of its strength, even if some or all of the attachment arrangement shears prematurely. This is a secondary safety feature that can be desirable in some circumstances and for some vehicles.

The front section 22C (FIG. 13) (preferably made from an advanced UHSS having tensile strength of 220 KSI) is longitudinally curved and has a front wall 23C with a channel 52C formed longitudinally therein, and also has top and bottom walls 24C and 25C that extend from front wall 23C. The walls 23C–25C define a rearwardly-facing C-shaped cross section. An aperture 53C is formed in the channel 52C at each end.

Figures 12, 13, 14:
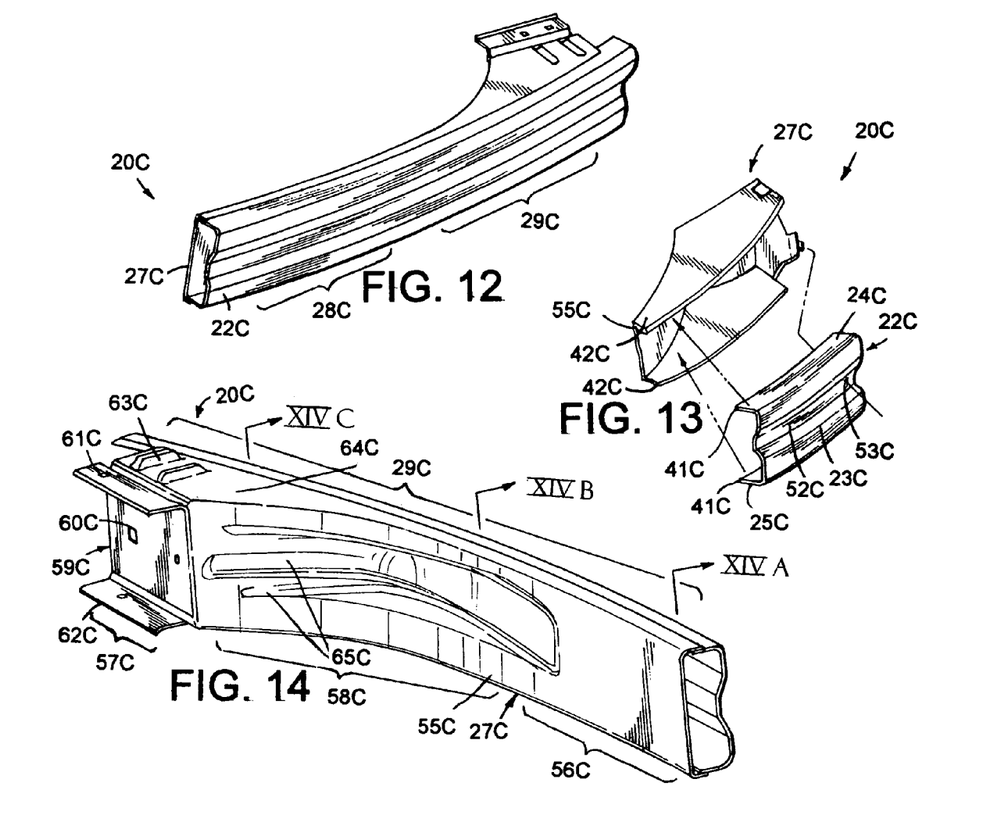
FIG. 12 is a perspective view of half of a modified bumper system incorporating aspects of the present invention.
FIG. 13 is an exploded perspective view of FIG. 12.
FIGS. 14–15 are additional perspective views of FIG. 12, FIG. 15 being enlarged to better show an end of the back section.
Figure 14A:
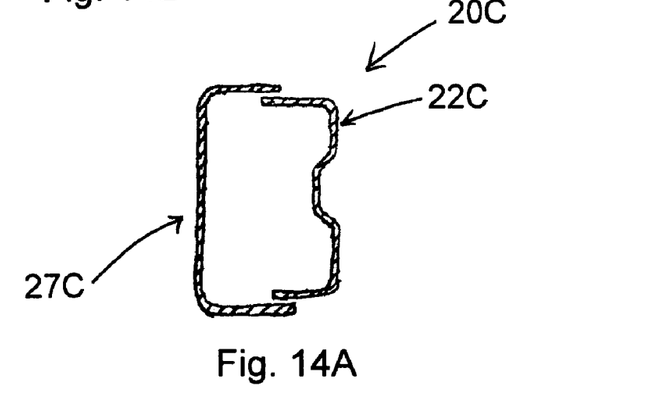
FIGS. 14A–14C are cross sections taken through FIG. 14 at lines XIV A, XIV B, and XIV C, respectively.
Figures 14B, 14C:
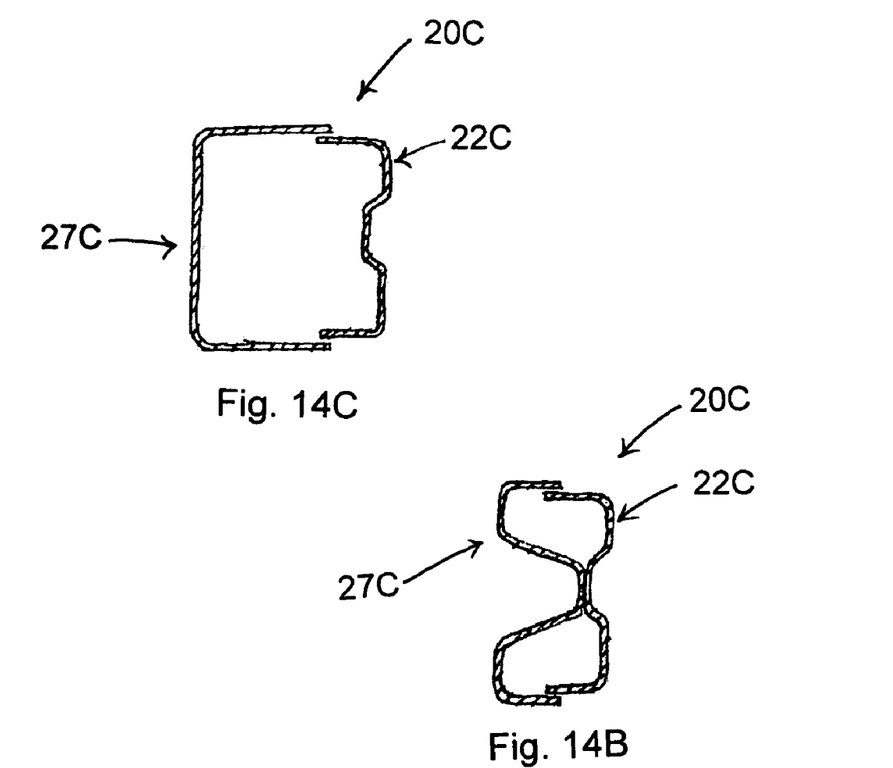
Figure 15:
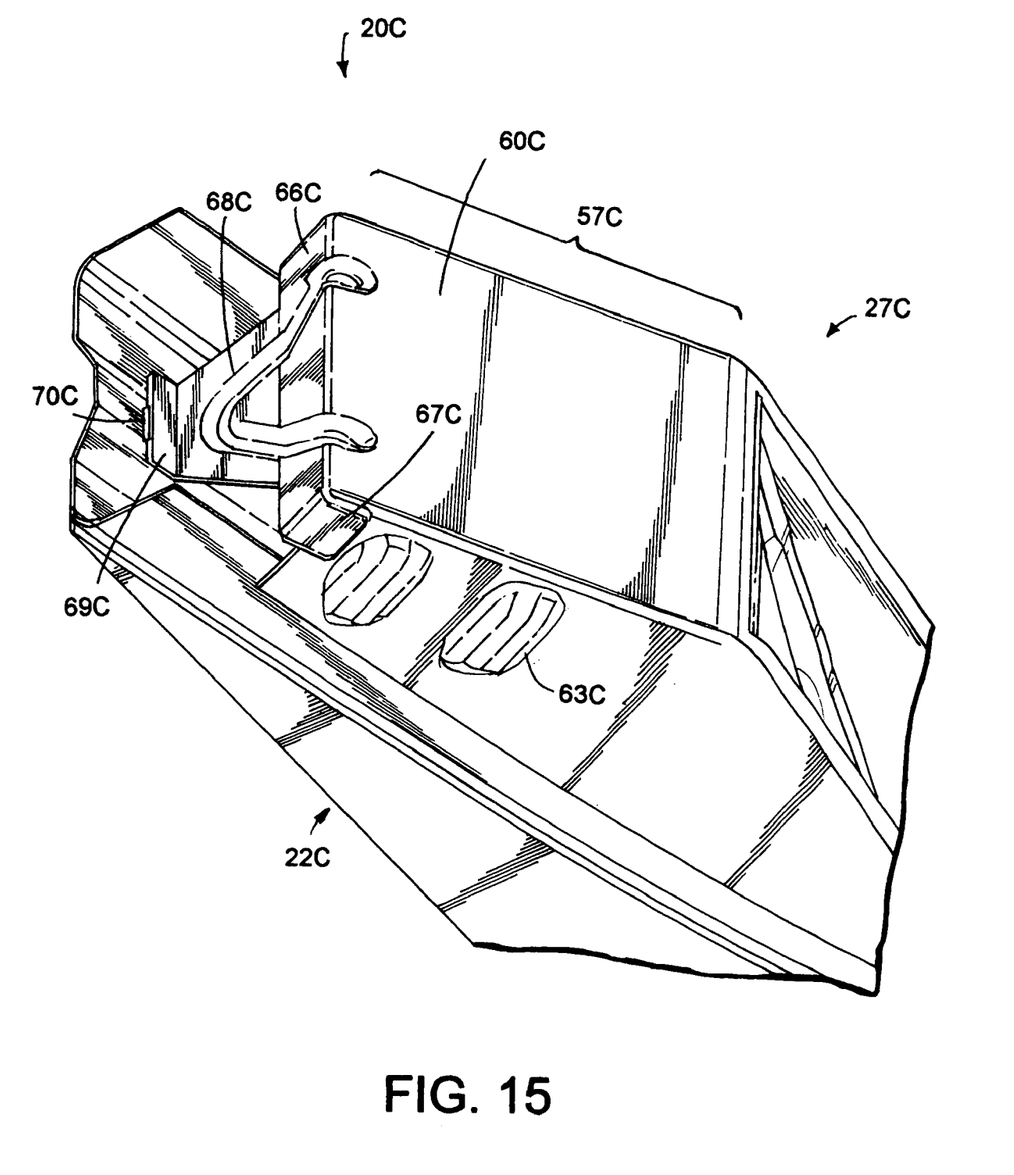

The back section 27C (preferably made from a stamped material such as high-strength, low alloy or UHSS steel) is longitudinally curved and has the edge flanges 42C shaped to match the front section 22C, and includes a center portion 28C and end portions 29C shaped to mate as desired with the walls 24C and 25C of the front section 27C. A rear wall 55C extends a length of the back section 27C. In the center portion 28C, the rear wall is relatively planar in shape. At an inboard part 56C of the end portions 29C, the rear wall is depressed forwardly toward the front wall 23C of the front section 22C. At an outboard part 57C of the end portions 29C, the rear wall is formed rearwardly to form a flat area that aligns with the similar outboard part on the other end portion. The intermediate part 58C of the end portions 29C transitions between the two parts 56C and 57C. The illustrated outboard part 57C is flat and is adapted to abut and be attached directly to the end cap 59C which forms the end of the frame side rail on the vehicle frame. This arrangement eliminates extra parts, since a bracket does not need to be attached to the beam 20C in order to attach the vehicle frame to the bumper 20C. The illustrated end cap 59C is channel shaped, and has a flat center plate 60C that attaches to the rear wall 55C in the outboard part 57C, and further has a pair of parallel flanges 61C and 62C that extend rearwardly for engaging an end of the vehicle frame side rails. Stiffening embossments or channels 63C are formed in the top wall 64C (and bottom wall) of the back section 27C, and also embossments or channels 65C are formed in the rear wall 55C of the back section 27C as desired for strength. The illustrated rear wall 55C terminates short of the end of the front section 22C (FIG. 15). An attachment flange 66C is formed integrally from an end of the rear wall 55C, and tabs 67C are extended from the top and bottom ends of the flange 66C. The tabs 67C are welded to otherwise be secured to the top and bottom walls of the back section 27C. A stanchion flange 68C extends from the attachment flange 66C, and a foot flange 69C extends from the stanchion flange 68C. The foot flange 69C abuts the surface of the front wall 23C of the front section 22C. Foot flange 69C can be welded to the front section 22C by applying MIG weld through the aperture 53C. In the absence of the aperture 53C, the foot flange 69C can be attached to the front section using either a spot weld or a mechanical fastener. Another attachment method might be the use of a finger tab 70C that extends from the foot flange 69C through the aperture 53C and is bent onto the channel 52C where it is out of the way. The arrangement including flanges 66C–70C support the ends of the front section 22C and provide the bumper 20C with good corner impact strength.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A bumper beam for a vehicle comprising:
   a front section of high material strength, the front section including a front wall and upper and lower walls defining a rearwardly-facing C-shaped cross section and a rearwardly open cavity; and
   a back section of lesser material strength than the metal front section the back section including a rear wall and top and bottom walls defining a forwardly-facing C-shaped cross section and a forwardly open cavity;
   the upper and lower walls of the front section being positioned within the forwardly open cavity of the back section and telescopingly engaging the top and bottom walls, respectively, of the back section and being secured thereto at top and bottom attachment locations that are subject to shearing forces upon impact; the front section and rear section combining to form a tubular section of changing cross-sectional size that, when impacted, provides significant impact strength, even if one or more of the attachment locations shearingly break loose.

2. The bumper beam defined in claim 1, wherein the rear wall of the back section includes end portions formed flat into coplanar alignment with each other, the end portions forming an integral mounting surface on the back section suitable for attachment to a vehicle frame.

3. The bumper beam defined in claim 2, wherein an end of the rear wall of the back section includes an attachment flange integrally formed from the material of the rear wall and that is bent forwardly into abutment with a rear surface of the front wall of the front section.

4. The bumper beam defined in claim 3, wherein the attachment flange includes a foot flange that abuts the rear surface of the front wall at a location longitudinally inboard of a terminal end of the front wall.

5. The bumper beam defined in claim 4, wherein the attachment flange includes an attachment tab that extend through an aperture in the front wall, the attachment tab being bent to lay against a front surface of the front wall.

6. The bumper beam defined in claim 1, wherein the front section defines a continuous open cross section suitable for being formed by a roll-forming process.

7. The bumper beam defined in claim 6, wherein the back section is made from a flat sheet of formable material suitable for being made using a stamping manufacturing process.

8. The bumper beam defined in claim 1, wherein the front section is made from ultra-high-strength steel (UHSS) material and the back section is made from a material other than UHSS material.

9. The bumper beam defined in claim 8, wherein the other material is chosen from a stampable material selected from a group consisting of high-strength low-alloy (HSLA) steel material, drawable steel, and aluminum.

10. The bumper beam defined in claim 1, wherein the back section is chosen from a stampable material selected from a group consisting of ultra-high-strength steel (UHSS) material, drawable steel, and aluminum.

11. The bumper beam defined in claim 1, wherein the front section and the back section include abutting flanges and are welded together along top and bottom walls of the back section.

12. The bumper beam defined in claim 1, wherein the front section defines a continuous cross-sectional shape that is formed by a roll-formed process and the back section defines a discontinuous cross-sectional shape that is formed by a stamping process.

13. A vehicle bumper beam adapted to withstand an impact force directed along a predetermined fore-aft direction of impact against a vehicle, comprising:
   a front section including a front wall and top and bottom walls defining a constant U-shaped cross section having a rearwardly open cavity, the front section being elongated in a direction perpendicular to the predetermined fore-aft direction of impact, the front section being made from a material selected from a group consisting of high-strength low-alloy (HSLA) steel and ultra-high-strength steel (UHSS) material; and
   a back section fit against and attached to a rear side of the front section, the back section having a length close to a length of the front section and including a first longitudinal portion that extends between the top and bottom walls to define with the front section a first shape having a first depth dimension, and including second longitudinal portions on opposing sides of the first portions that extend between the top and bottom walls to define with the front section a second shape having a second depth dimension, at least one of the first and second shapes being tubular, the back section being made from a material selected from a group consisting of ultra-high-strength steel (UHSS) material, high-strength low-alloy (HSLA) steel, aluminum, and polymeric material;
   the front and back sections having attachment flanges that telescopingly overlap in a direction parallel to the predetermined fore-aft direction of impact, the attachment flanges being secured together at attachment locations that undergo shear stress upon the beam receiving the impact force along the fore-aft direction, but the attachment flanges of the front section being located inside the attachment flanges of the back section so that, even if the attachment locations shear off, the attachment flanges of the front section remain captured within the attachment flanges of the back section.

14. The vehicle bumper beam defined in claim 13, wherein the front section defines a continuous cross-sectional shape that is formed by a roll-formed process and the back section defines a discontinuous cross-sectional shape that is formed by a stamping process.

* * * * *